United States Patent

[11] 3,587,179

| [72] | Inventor | Evalin T. Oeswein, 3803 Grandview Ave. Louisville, Ky. |
|---|---|---|
| [21] | Appl. No. | 756,175 |
| [22] | Filed | Aug. 29, 1968 |
| [45] | Patented | June 28, 1971 |

[54] METHOD FOR PRODUCTION OF ORNAMENTAL DESIGN IN PLASTIC OBJECT
2 Claims, 4 Drawing Figs.

[52] U.S. Cl. ................................................. 35/26, 117/63
[51] Int. Cl. ......................................... G09b 11/00
[50] Field of Search.......................................... 35/26; 156/59, 2, (Inquired); 117/36.7, 63, (Inquired); 161/160, (Inquired)

[56] References Cited
UNITED STATES PATENTS

| 1,769,599 | 7/1930 | Neidich ....................... | 156/2UX |
| 2,811,800 | 11/1957 | Gesek ........................... | 35/26UX |
| 3,298,895 | 1/1967 | Plambeck ...................... | 117/36.7X |
| 3,324,574 | 6/1967 | Markley ....................... | 35/26 |

*Primary Examiner*—Harland S. Skogquist
*Attorney*—Edward M. Steutermann

ABSTRACT: A method for production of an ornamental design in intaglio or relief in a selected surface of an article of foamed or expanded plastic object where the selected design is transferred to the surface of the object and a selected solvent is applied to the surface to melt the plastic in selected locations so the plastic collapses to form the outline of the design in the surface. The solvent can be applied directly to the design to form the design in the surface in intaglio or the solvent can be applied to the areas adjacent to the design to form the design in the surface in relief.

PATENTED JUN28 1971 3,587,179
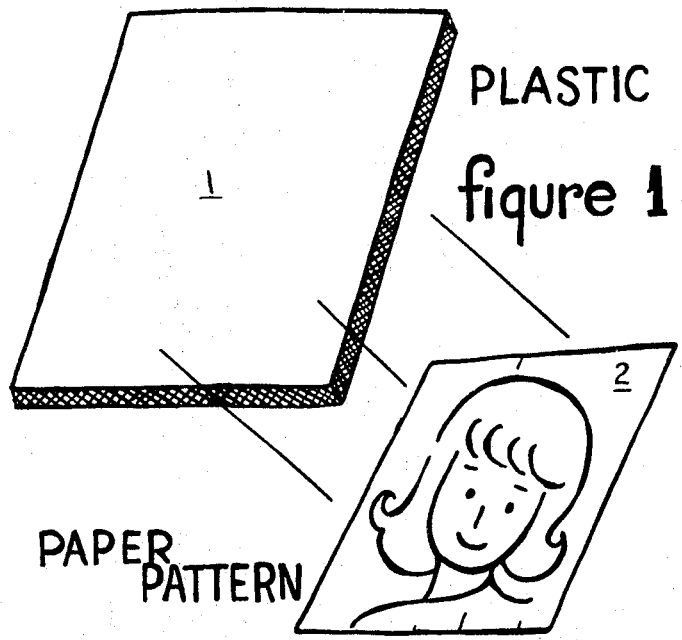
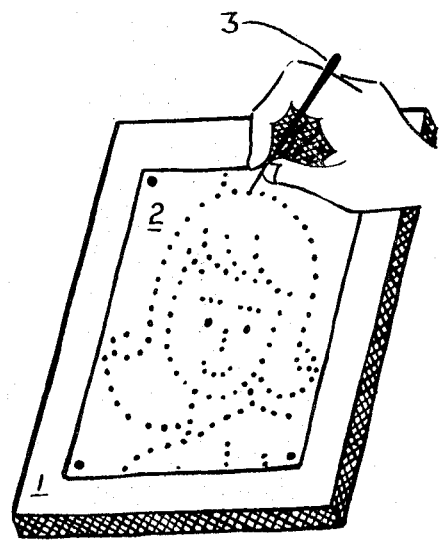
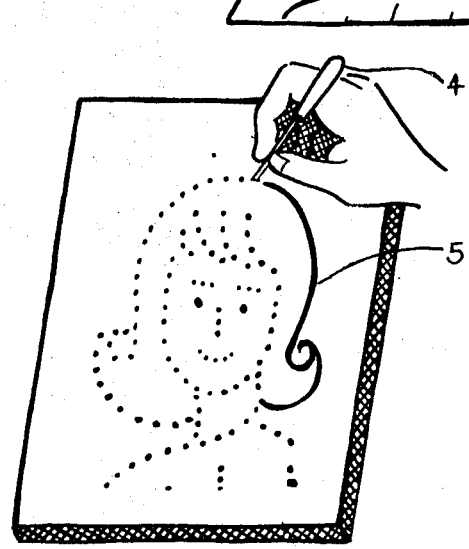
INVENTOR.
EVALIN T. OESWEIN
BY Edward M. Stevens

METHOD FOR PRODUCTION OF ORNAMENTAL DESIGN IN PLASTIC OBJECT

SUMMARY OF THE INVENTION

Plastic materials, in general, possess characteristics which make them useful and desirable for ornamental purposes and various methods have been devised to provide selected designs in the surface of such ornamental plastic objects. In some methods the design has been formed in relief by removing selected portions of the plastic, for example by cutting, to form the design in relief while in other methods the additional plastic is added to the surface by gluing or other methods to form the design in intaglio or relief. Such methods are time consuming and expensive and in applications where the object is made of foamed plastic, for example expanded polystyrene it has been very difficult to use either method satisfactorily. For example by the method where the design is to be cut into the surface of a foamed plastic object the cutting implement must be extremely sharp, must be operated at a very high rate of speed, and the rate of feed must be very low to prevent tearing the plastic.

SUMMARY OF THE INVENTION

It has been recognized that the present invention provides an efficient method for producing a selected design in the surface of a foamed plastic object.

It has been recognized that the present invention provides a straightforward method for producing such an ornamental design in a selected surface of a foamed plastic object in intaglio or in relief without expensive high speed tools or other complex equipment and without the time consuming process of gluing additional pieces of plastic onto the surface of the plastic object.

Moreover it has also been recognized that the present invention likewise advantageously provides a straightforward method for reproducing a picture or other planar design in the surface of a selected foamed plastic object in intaglio or relief.

Various other features of the present invention will become obvious to those skilled in the art upon reading the disclosure set forth hereinafter.

More particularly, the present invention provides a method for production of a selected design in intaglio in the surface of a foamed plastic object comprising; scribing the design into the selected surface of the foamed plastic object; and applying a selected solvent to the surface along the scribed lines of the design so the plastic is melted and the plastic collapses in the area adjacent the points of application of the solvent to form the design in the surface in intaglio.

The present invention also provides a method for producing a selected design in relief in a surface of a foamed plastic article comprising; transferring the outline of the design to the selected surface of the foamed plastic article; and applying a selected solvent to the surface in the areas adjacent the design so the plastic in such adjacent areas is melted and collapses to leave the design projecting outwardly from the surface.

It is to be understood that the description of one method in accordance with the present invention given hereinafter is not by way of limitation and that various other methods in accordance with the present invention will occur to those skilled in the art.

Referring to the FIGS. which show, sequentially, one method in accordance with the present invention to transfer a design from a paper pattern to a surface of a selected foamed plastic object where the design is formed in intaglio;

FIG. 1 shows a plastic object and a paper pattern with a design to be produced in the surface of the plastic object;

FIG. 2 shows the pattern in place on the plastic object and illustrates the first step in one method of transferring the design to the plastic object;

FIG. 3 illustrates a second step in the transfer of the design from the pattern to the surface of the foamed plastic object; and, FIG. 4 illustrates one method within the scope of the present invention for selectively collapsing a portion of the foamed plastic to form the selected design.

The first step in the method shown in the FIGS. is to transfer the design from the paper pattern 2 to the selected surface of the expanded plastic sheet 1, for example a sheet of polystyrene made of beads of polymerized styrene which are expanded so the volume of each bead is mostly void and there is very little plastic in each bead. The beads are then molded into various shapes such as sheet 1. The polystyrene is lightweight yet very strong with attractive appearance and low moisture absorption characteristics so it is not affected by adverse environmental conditions.

In the method according to the present invention for producing a design in a surface of a foamed plastic object the selected design is transferred to the selected surface of the foamed plastic object. Several methods can be used to transfer the design to the plastic object including the method illustrated in the FIGS. where the design is transferred from a paper pattern. In the method shown paper pattern 2 is placed on the selected surface of the plastic sheet 1 and using a pointed instrument 3 holes are punched through the paper and into the plastic sheet 1 so the outline of the design is duplicated in the surface of the plastic sheet, as a series of spaced holes. Pattern 2 is then removed from the plastic sheet 2 and, as shown in FIG. 3, the holes are connected by cutting the surface of plastic sheet 1 with a knife so the design 5 originally carried by the pattern 2 is inscribed in the surface of the plastic sheet 1 as a series of continuous scored lines.

After the design 5 has been fully transferred to the surface of sheet 1 as a series of scored lines, in accordance with one feature of the present invention, a selected solvent, which will melt the plastic of sheet 1 is applied to the surface of the sheet along the scored lines of design 5, for example by tracing along the lines with a brush 6 which is periodically dipped into the solvent. The solvent flows into the scored lines in the surface of sheet 1 so the expanded plastic in these areas is melted and collapses to form the design in the surface of the sheet in intaglio.

The solvent is selected to achieve a desired result and the actual solvent used is determined by the type of expanded plastic used and the solubility of the plastic in the solvent which materially affects the depth of the design in the plastic.

For example, when a deep design is desired a solvent is used which easily dissolves a relatively great amount of plastic and such a solvent can also have a low vapor pressure so it remains in contact with the plastic until a saturated solution is formed with the melted plastic and the solution eventually dries after the plastic has collapsed.

On the other hand, when it is desired to produce the selected design in the surface of the plastic, for example polystyrene, in a shallow form a solvent such as acetone which has a low vapor pressure can be used which vaporizes very rapidly so very little of the plastic is melted and collapsed before the solvent has vaporized and the plastic hardens.

When the application of the solvent to the surface of the plastic has been completed the surface is allowed to harden and can then be painted to further enhance the final appearance.

It will be understood that in the one example of the present invention hereinbefore described the design was formed in intaglio but that within the scope of the present invention the selected design can be formed in the surface of an expanded plastic object in intaglio or in relief or a combination thereof. For example, to form the design in relief the design is transferred to the surface and solvent is applied to selected locations of the surface but not to the design so that the areas adjacent the surface collapse to leave the design projecting outwardly in relief.

As in the method previously described for producing the design in intaglio the surface can then be painted or otherwise treated to enhance the appearance.

I claim:

1. A method for producing a design in a surface of a foamed plastic object comprising: applying a guide in the shape of said design to said surface; cutting slits into said surface in accordance with said guide whereby said slits are cut into said surface in the form of said design; applying a solvent for said plastic to said slits so said solvent flows into and along said slits to melt said plastic in areas of said surface adjacent said slits whereby said plastic adjacent said slits is collapsed through a segment of the depth of said object to cause visually discernable depressed areas in said surface in the form of said design.

2. The method according to claim 1 including: applying a coating material to the surface after said visually discernable design has been formed.